E. SCHNEIDER.
AIMING APPARATUS FOR GUNS.
APPLICATION FILED JUNE 16, 1919.

1,361,779.

Patented Dec. 7, 1920.
8 SHEETS—SHEET 1.

Inventor:
Eugene Schneider
By Mauro, Cameron, Lewis & Massie
Attorneys

E. SCHNEIDER.
AIMING APPARATUS FOR GUNS.
APPLICATION FILED JUNE 16, 1919.

1,361,779.

Patented Dec. 7, 1920.
8 SHEETS—SHEET 3.

E. SCHNEIDER.
AIMING APPARATUS FOR GUNS.
APPLICATION FILED JUNE 16, 1919.

1,361,779.

Patented Dec. 7, 1920.
8 SHEETS—SHEET 4.

Inventor:—
Eugene Schneider
By Mauro, Cameron, Lewis & Massie
Attorneys.

Fig. 16

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

AIMING APPARATUS FOR GUNS.

1,361,779.  Specification of Letters Patent.  Patented Dec. 7, 1920.

Application filed June 16, 1919. Serial No. 304,660.

*To all whom it may concern:*

Be it known that I, EUGÈNE SCHNEIDER, a citizen of the Republic of France, residing at 42 Rue d'Anjou, Paris, France, have invented a new and useful Improved Aiming Apparatus for Guns, which invention is fully set forth in the following specification.

This invention has for its object to provide an improved aiming apparatus more particularly applicable to field artillery.

The improved apparatus is so constructed as to allow one and the same gun layer to perform all the operations of sighting, elevating and making the corrections due to the transverse and longitudinal inclinations of the gun carriage. The improved apparatus allows of modifying the elevation and at the same time of correspondingly altering the firing angle of the gun barrel, while maintaining the line of sight immovably directed upon the target in the case of direct fire, or upon a register mark in the case of indirect fire.

To this end, the improved apparatus comprises in the known manner a bracket support journaled on an arm which is in its turn pivoted on an axle parallel to the axis of the gun barrel and carried by one of the trunnions of the gun cradle. This bracket is capable of being displaced by known means, with the arm that serves as its pivot, around the axis connecting it pivotally to the trunnion of the gun cradle, whereby the said bracket can be brought into a vertical plane. The said bracket is also capable of being displaced around the said arm in such a manner that after having first brought the bracket into a vertical position, the vertical position of the sighting apparatus proper can then be restored.

The essential characteristic feature of this invention consists in this that the bracket supporting the sighting apparatus, constructed as above described, carries directly a device for reading off the elevation, connected to a device for indicating the site-elevation of the target. This latter device may itself be wholly or partly contained or mounted in the bracket supporting the sighting apparatus. The connection between the device for indicating the site-elevation and the device for indicating the range-elevation is such that the gunlayer in giving the site-elevation, moves automatically the device indicating the range-elevation, through a corresponding angle, so that the same gunlayer is able immediately afterward, by operating the gun elevating mechanism, to elevate the gun barrel to an angle corresponding to the firing angle, by simply moving the scale mark of the desired range-elevation opposite a register mark carried by the bracket supporting the sighting apparatus.

Various constructional forms of this invention are illustrated by way of example in the accompanying drawings in which:

Figures 1 to 4 illustrate a first constructional example.

Figs. 7, 8 and 9 illustrate a further modification in which

Figs. 10, 11 and 12 illustrate a further modification showing a particularly supple construction in which

Figs. 13, 14 and 15 show a further modification in which

Figs. 16 and 17 show a last constructional form in which

In Figs. 1 to 4, A is the sighting apparatus proper of any known type mounted in a socket $b$ formed on the bracket B. This bracket is journaled in the known manner on an arm C provided for this purpose with a journal $c$. The said arm is in its turn rotatably mounted on an axle D parallel to the axis of the gun barrel, and carried by one of the trunnions E of the gun carriage cradle. F is one of the frame plates of the gun carriage proper.

Figure 1:
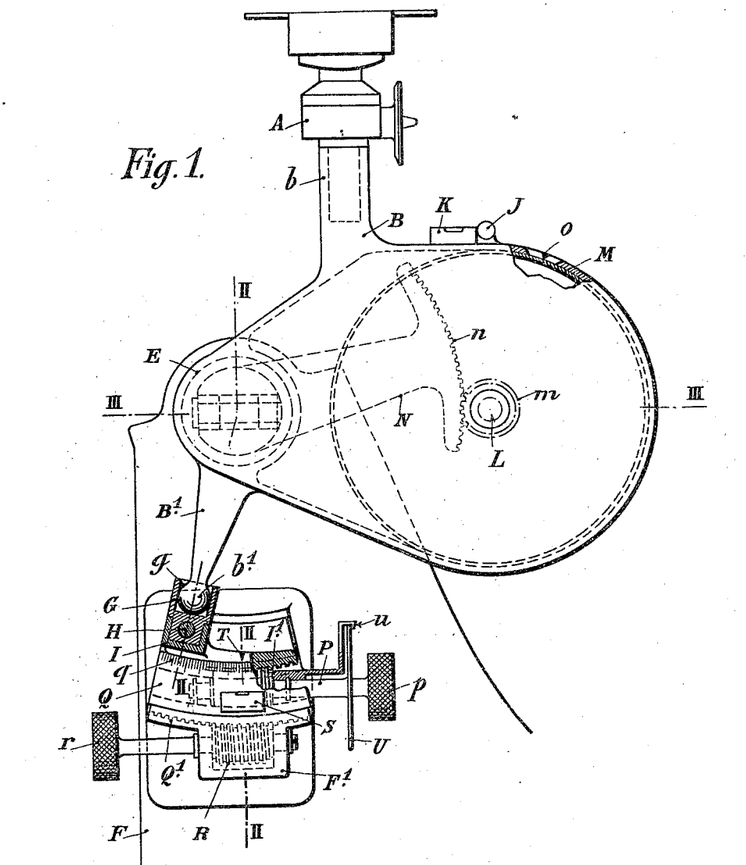
Fig. 1 is a longitudinal elevation partly in section on the line I—I of Fig. 2.
Figures 2, 4, 17:
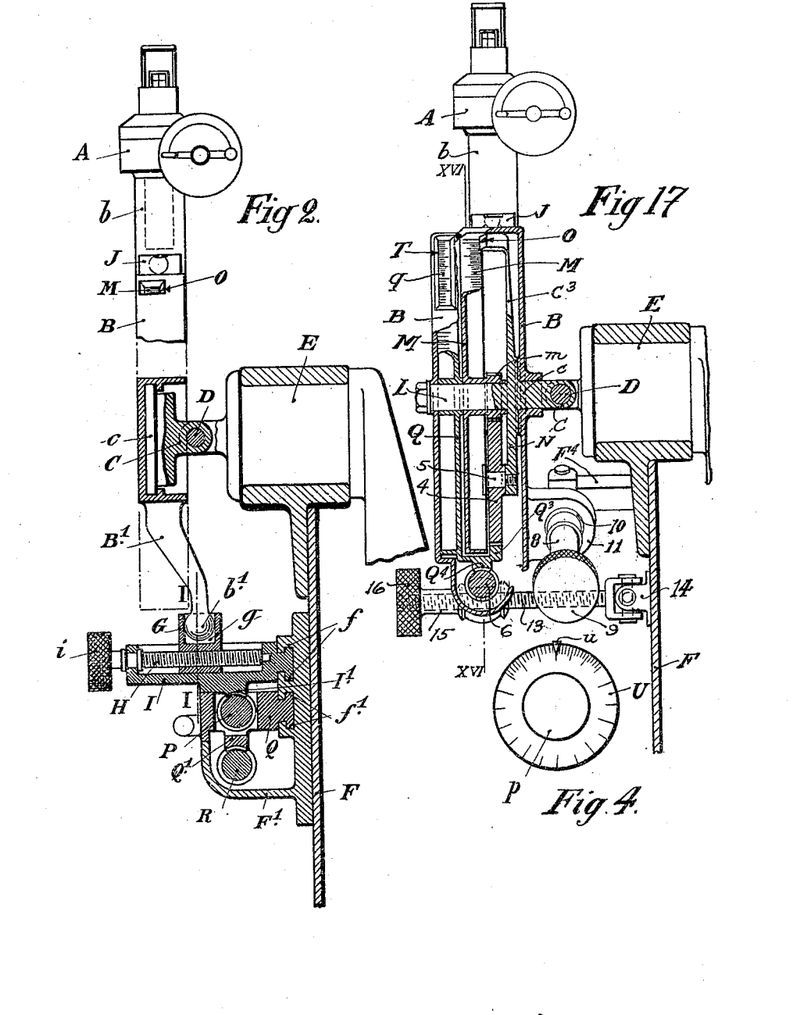
Fig. 2 is a cross section partly in elevation on the line II—II of Fig. 1.
Fig. 4 is an elevation of a detail of the device for indicating the site-elevations.
Fig. 17 is a section on the line XVII—XVII—XVIII of Fig. 16, the part section XVII—XVII being assumed to be folded back into the plane of section XVII—XVII which is in its turn assumed to be folded back on to the plane of projection.
Figure 3:
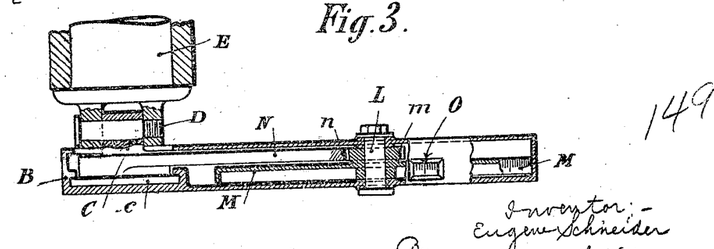
Fig. 3 is a horizontal section on the line III—III of Fig. 1.

The bracket B is provided with an extension $B^1$ having a spherical head $b^1$ engaged in a cylindrical socket $g$ formed in a slide block G. This slide block serves as a nut for a worm H which is journaled in a slide block I movable in a guide $f$, formed in the carriage frame plate F. This guide has the shape of an arc of a circle and is centered on the axis of the trunnion E.

By operating the knurled knob $i$, the nut socket G is moved along the worm H and thus causes the extension $B^1$ to rotate, and consequently the bracket B to rotate around the pivotal axle D. By this known means, the bracket B can be brought into a vertical plane irrespectively of the inclination of the wheeled axle of the gun carriage, and consequently of the trunnion E. As well known when the bracket B has been brought into a vertical plane, the inclinations given subsequently to the gun barrel are automatically corrected according to the inclination of the carriage axle by executing a training movement that maintains the line of sight directed upon the target.

The uprighting of the bracket B is effected by bringing the air bubble of a spirit level J between its register marks.

As hereinafter described, a vertical position of the sighting apparatus proper A is effected by moving the slide block I in the guide $f$.

The apparatus is vertical when the air bubble of a spirit level K is situated between its register marks.

According to the present invention, the bracket B constitutes, by means of an axle L parallel to the axis of the journal $c$, a direct pivot for a drum M indicating the range-elevations. The movements of this drum are coördinated on one hand to the movements of the trunnion E, and on the other hand to the movements of an apparatus for giving the site elevations. For this purpose the drum M is fixed to a pinion $m$ which meshes with a toothed sector $n$ carried by an arm N fixed to the arm C.

It will be at once clear that owing to this kinematic connection between the pinion $m$ and the journal $c$ of the bracket B, all rotational movements of the trunnion E around its axis produces a rotation of the pinion $m$ and of the drum M simultaneously with a free movement of the journal $c$ in said bracket B. In this movement the scale marks of the drum will move past a register mark O inscribed on the bracket B.

The connection between the range-elevation drum M and the apparatus for indicating the site-elevations is effected as follows:

The slide block I carries a toothed sector $I^1$ curved to an arc of a circle concentric to the trunnion E. The helical teeth of this sector meshes with a worm P journaled in a slide block Q which is guided in a guide $f^1$ formed in the carriage frame plate F. The slide block Q carries in its turn a toothed sector $Q^1$ which is concentric to the trunnion E and which engages with a worm R journaled in a bracket $F^1$ fixed to the frame plate F.

It will be seen that by operating the knurled knob $p$ carried by the worm P, the toothed sector $I^1$ is moved, while the slide block Q is rendered stationary by the intermeshing of the sector $Q^1$ and the worm R. The movement of the sector $I^1$ causes the bracket B—$B^1$ to turn around the journal $c$, and consequently causes the pinion $m$ to roll over the toothed sector $n$.

The consequence is that by inclining the sighting apparatus through an angle equal to the site-elevation of the target, the range-elevation drum M will be moved through an equal angle at the same time. By operating the knurled knob $r$ carried by the worm R, the toothed sector $Q^1$ is moved, and with the latter, owing to the intermeshing of the worm P and the sector $I^1$, the slide block I is also moved, producing a rotation of the bracket B upon the journal $c$.

The slide block Q carries a site-elevation scale $q$ adapted to move past a register mark T engraved on the slide block I. The slide block Q carries on the other hand a spirit level S.

The elevating of the gun by means of the improved apparatus is effected as follows:

When the axis of the gun barrel is horizontal, the register mark O carried by the bracket B should be situated opposite the zero of the scale on the range-elevation drum M. At the same time, since the sighting apparatus is vertical, the zero of the site-elevation scale $q$ should be opposite the register mark T engraved on the slide block I.

According as the site of the target is determined by direct observation or is given to the gunlayer by the commander, the line of sight is inclined by operating the knob $p$ in such a manner as to direct it upon the target or bring opposite the register mark T the division of the site-elevation scale $q$ corresponding to the given site angle.

In operating the worm P to give the site angle, the toothed sector $I^1$ is moved, and consequently also the slide block I, and by means of the latter, the extension $B^1$ and the bracket B which pivots in this movement around the journal $c$. At the same time the pinion $m$ rolls over the toothed sector $n$ which remains stationary. Consequently the zero of the scale on the range-elevation plate is thereby shifted relatively to the register mark O, through an angle equal to the site angle.

The sighting apparatus remaining directed upon the target, or inclined according to the site angle given by the gun commander, the gunlayer is able to incline the gun barrel through an angle equal to the desired firing angle by actuating the elevating mechanism in such a manner as to bring in front of the register mark O, the scale mark on the drum M corresponding to the given range-elevation.

For the same site-elevation the gunlayer can alter the range-elevation without the line of sight ceasing to remain directed upon the target or inclined according to the given site-elevation.

The corrections necessitated by the transverse and longitudinal inclinations of the gun carriage during the firing operations, are effected as hereinbefore stated by operating the respective knurled knobs $i$ and $r$.

As shown in Figs. 1 and 4, a graduated plate U keyed on the worm P is adapted to move past a pointer $u$ carried by the slide block Q. For a complete revolution of the knob $p$, the slide block Q will move through one division of the site-elevation scale $q$. If one division of the scale $q$ corresponds for instance to ten thousandths, then each of the hundred divisions of the disk U will correspond to a tenth of a thousandth.

On the other hand the ratio between the numbers of teeth of the pinion $m$ and sector $n$ is so chosen as to cause the range-elevation plate to make one complete revolution when the gun barrel is moved from one to the other of its extreme inclinations.

Figure 5:
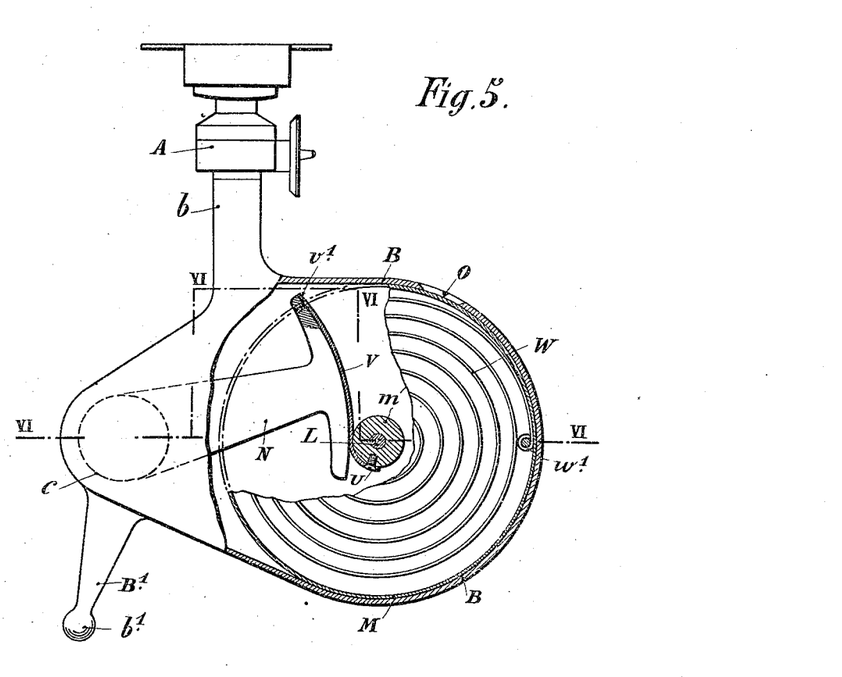
Figs. 5 and 6 are respectively an elevation partly in section on the line V—V of Fig. 6, and a horizontal section on the line VI—VI of Fig. 5, showing a modified construction.
Figure 6:
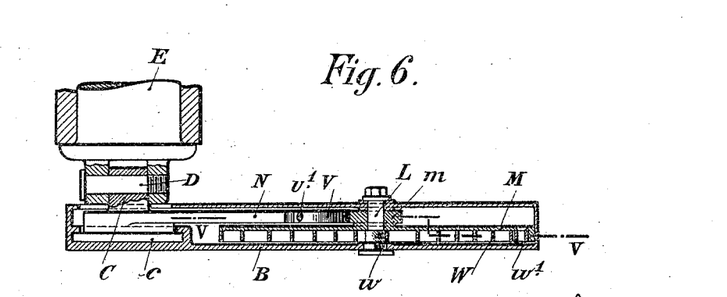

The modification shown in Figs. 5 and 6 differs from the preceding constructional form only by the manner of connection between the journal $c$ and the member that is fixed to the range-elevation drum M and mounted on the axle L carried by the bracket B. The pinion $m$ is in this construction replaced by a simple small disk to the periphery of which there is attached one end $v$ of a flexible band V stretched over a plain sector formed on the arm N, its other end $v^1$ being attached to the said sector.

A spiral spring W is attached at its inner end $w$ to the axle L, and at its outer end $w^1$ to the inner wall of the range-elevation drum M.

The movements of the extension $B^1$ will cause the band V to be wound up or unwound, the said band remaining constantly in tension by the action of the spiral spring W. The advantage of this manner of connection over that of the preceding example, consists in that it avoids the errors due to "play" that may be produced between the teeth of the sector $n$ and pinion $m$.

In the examples just described, the apparatus for indicating the site-elevations is situated outside the bracket B, and therefore its connecting mechanism to the range-elevation drum is situated partly inside and partly outside the bracket B.

In the hereinafter described examples the apparatus for indicating the site-elevations and its connecting mechanism to the range-elevations drum, are wholly situated in the bracket of the sighting apparatus.

Figure 7:
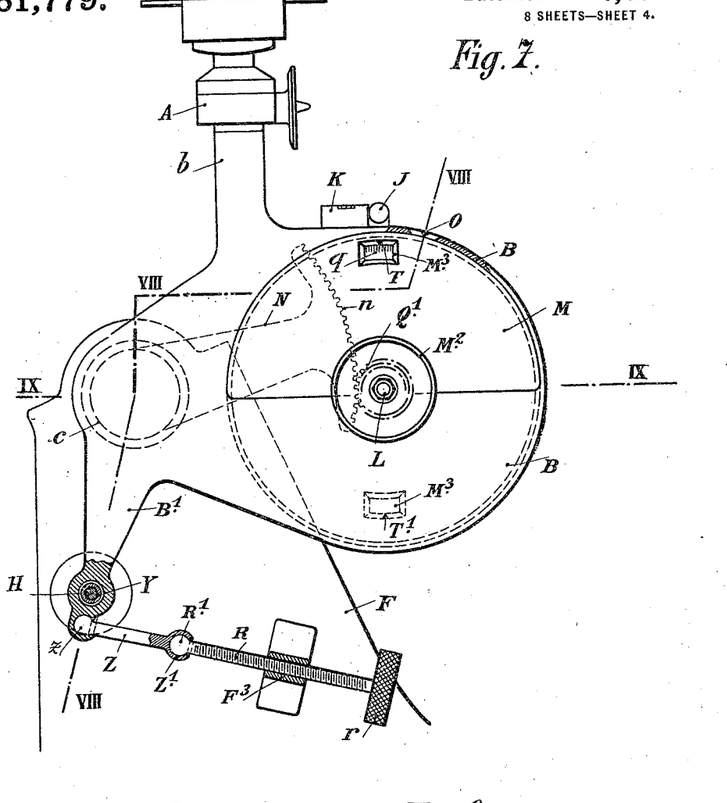
Fig. 7 is a side elevation.
Figures 8, 14, 15:
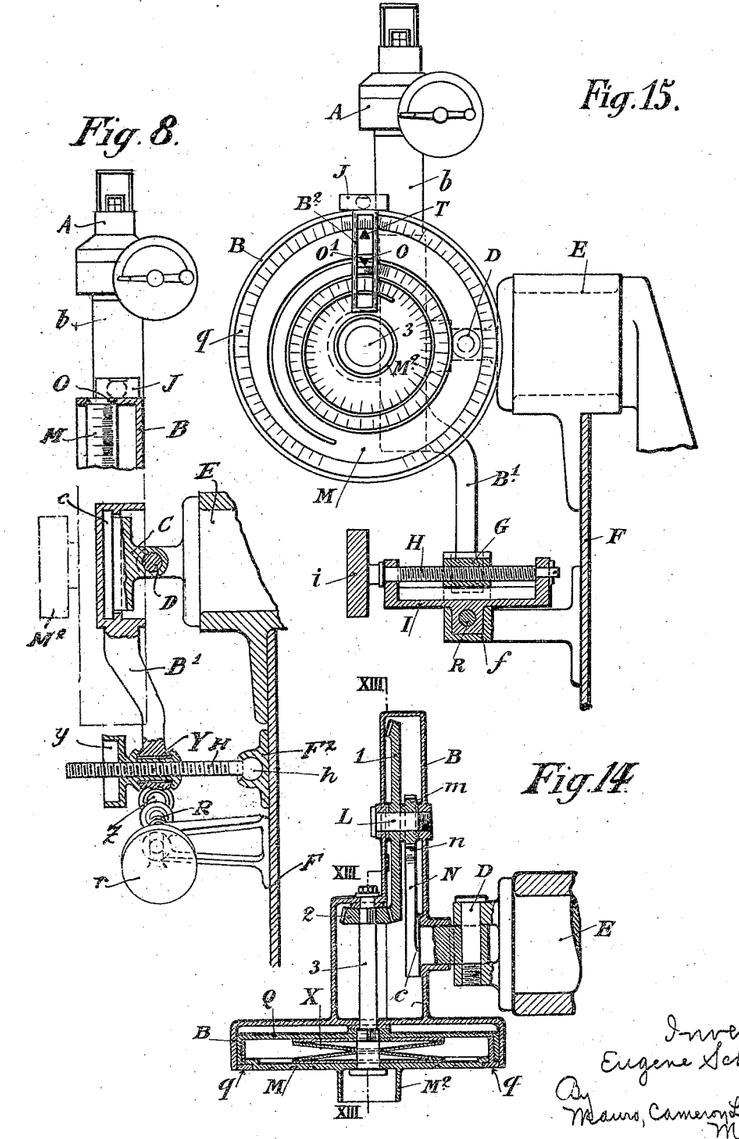
Fig. 8 is an end elevation partly in cross section on the line VIII—VIII of Fig. 7
Fig. 14 is a horizontal section on the line XIV—XIV of Fig. 13.
Fig. 15 is an end elevation partly in section on the line XV—XV of Fig. 13.
Figure 9:
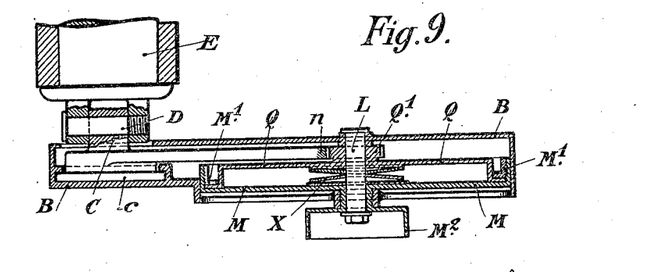
Fig. 9 is a horizontal section on the line IX—IX of Fig. 7.

Figs. 7, 8 and 9 illustrate a first example of this construction.

In this example the toothed sector $n$ formed on the arm N meshes with a pinion $Q^1$ fixed to the plate Q movable around a pivot pin L carried by the bracket B. This plate Q carries on a peripheral rim a scale $q$ indicating the site-elevations. It is let into the drum M which carries on its periphery the scale of the range-elevations. The rim of the plate Q is maintained always pressed by Belleville washers X against the back of the drum M, and an internal collar $M^1$ fixed thereto. $M^2$ is a knurled knob for operating the drum M.

The tightening of the site-elevation plate Q against the range-elevation drum M assures the positive coöperation of these two parts in the rotary motion imparted to the pinion $Q^1$. This tightening is however on the contrary insufficient to prevent a relative angular displacement between M and Q by the operation of the knurled knob $M^2$.

By operating this knob $M^2$ the drum M is moved, while the plate Q remains stationary owing to the meshing of the pinion $Q^1$ with the toothed sector $n$. The back of the drum M is formed at two diametrally opposite points with apertures $M^3$ through which is visible the scale $q$ of the site-elevation plate Q. Opposite these apertures the drum M carries pointers T and $T^1$ which in the angular movement of the range-elevation drum, are consequently moved over the site-elevation scale.

When it is desired to elevate the drum without direct observation of the target, that is to say, when the site-elevation is given by the commander, the said gunlayer, in order to produce the site-elevation, actuates the knob $M^2$ in such a manner as to bring the pointer T opposite the division on the plate Q that corresponds to the given site-elevation. In other words the gunlayer shifts the range-elevation scale through an angle equal to the given site-elevation.

In order finally to elevate the gun barrel through an angle equal to the firing angle (an algebraic sum of the site and range elevations), the gunlayer has merely to operate the elevating mechanism in such a manner as to bring opposite the fixed register mark O carried by the bracket B, the range-elevation scale corresponding to the given range.

The actuation of the elevating mechanism drives through the trunnion E, the arm C—N, the pinion $Q^1$ and the combination Q—L.

The lodgment of the site-elevation indicating apparatus inside the bracket B allows of simplifying the mechanism for correcting the transverse and longitudinal inclinations of the gun carriage.

As shown in Figs. 7 and 8, a nut Y movable in the extension $B^1$ is engaged on a screw-threaded rod H, one end of which has a spherical head $h$ held in a recess $F^2$ of corresponding shape carried by the carriage frame plate F. In a prolongation of the extension $B^1$ there is formed a recess for the spherical head $z$ of a connecting rod Z which at its opposite end $Z^1$ forms a lodgment for a spherical head $R^1$ of a screw R movable in a nut $F^3$ carried by the carriage frame plate F.

By operating the knurled knob $y$ the nut Y is caused to move along the screw H, and thus the bracket B can be maintained in a vertical plane for the purpose of correcting the transverse inclinations of the carriage.

By operating the knob $r$, the screw R is moved in the nut $F^3$, and by means of the latter the connecting rod Z and the arm $B^1$ are also moved, the screw H moving with its head $h$ in the fixed recess $F^2$. This latter operation allows of making the corrections for the longitudinal inclinations of the gun carriage.

When the gunlayer has to get the site-elevation by direct observation of the target, he operates the knob $r$ until he has directed the line of sight upon the said target. In this movement the bracket B moves around the journal $c$ which remains stationary, while the pinion $Q^1$ rolls over the toothed sector $n$. The range-elevation drum M, fixed to the plate Q, revolves through an angle equal to the angle through which the bracket B has been turned. The consequence is that the range-elevation scale has been shifted relatively to the register mark O through an angle equal to the site-elevation, as was the case before in aiming for indirect fire.

Figure 10:
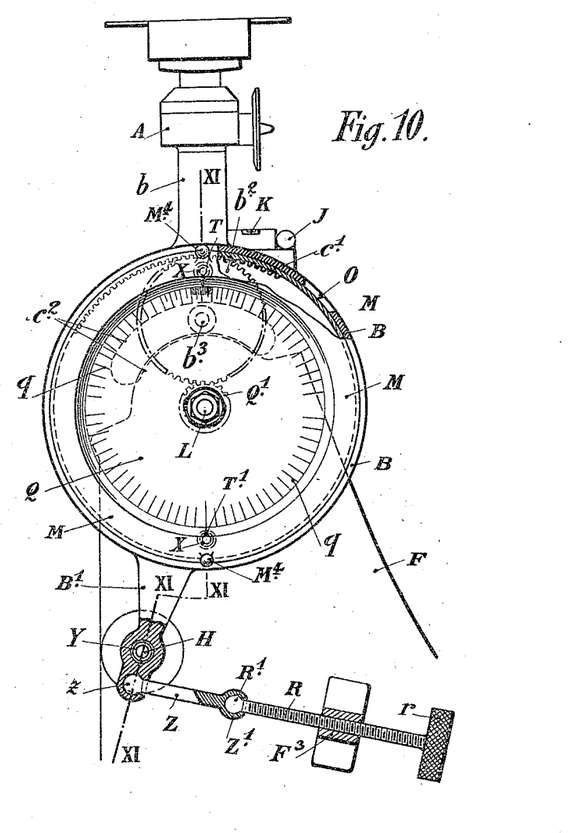
Fig. 10 is a front elevation partly in section.
Figures 11, 12, 13:
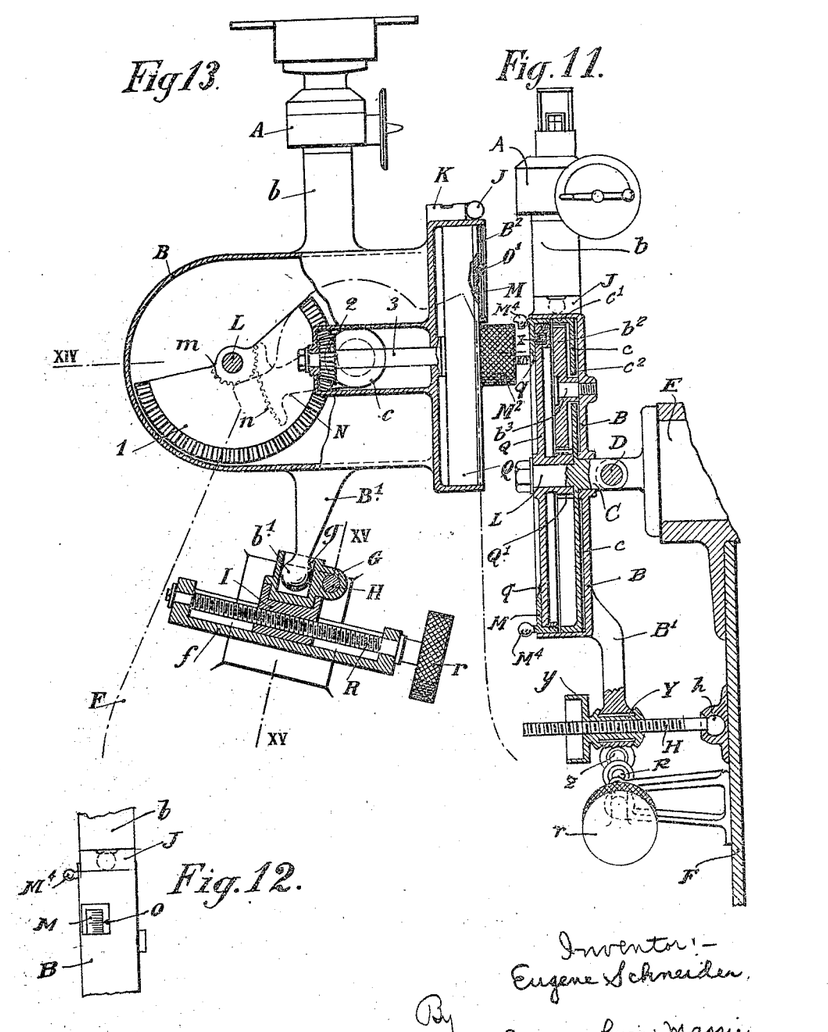
Fig. 11 is a side elevation partly in section on the line XI—XI of Fig. 10.
Fig. 12 is a partial elevational detail.
Fig. 13 is a side elevation partly in section on the line XIII—XIII of Fig. 14.

Figs. 10 to 12 illustrate a particularly simple constructional form.

In this example, the journal $c$ formed on the arm C jointed to the cradle trunnion E, is enlarged, and has projecting from its center an axle pin L upon which are mounted the range-elevation drum M and the site-elevation plate Q. The bracket B constitutes practically a drum mounted directly on the journal $c$.

The plate Q is fixed to the pinion $Q^1$ which meshes with a toothed wheel $b^2$ movable around an axle pin $b^3$ carried by the bracket B. This pinion $b^2$ meshes on the other hand with a ring of teeth $c^1$ projecting from the periphery of the journal $c$.

The range-elevation drum M which has its scale mark on its rim so that the said scale moves opposite a register mark O engraved on the bracket B, carries on the other hand two projecting pointers T, $T^1$ adapted to move opposite the scale $q$ of the site-elevation plate Q. This latter is let into the drum M and kept tightly pressed against it by two spring studs X. An angular displacement may however be given to the drum M on the plate Q, for which purpose the said drum is provided with operating knobs $M^4$.

The site-elevation having been given by the commander, the gunlayer shifts the drum M in such a manner as to bring, according to the circumstances of the case, the pointer T or the pointer $T^1$ opposite the site-elevation scale corresponding to that angle. The zero of the range-elevation scale is thus shifted relatively to the register mark O, by an angle equal to the site-elevation of the target.

On then operating the gun-elevating mechanism, the gunlayer will require merely to move opposite the register mark O, the scale on the drum M that corresponds to the given range-elevation, whereupon the gun barrel will be elevated to the desired firing angle.

The mechanism for operating the bracket B for direct firing, as well as the mechanism for making the corrections for the transverse and longitudinal inclinations of the gun carriage, are the same as in the preceding example.

When the gunlayer gives the range-elevation, by moving by means of the trunnion E, the arm C—$c$, the axle pin $b^3$ remains stationary, while the ring of teeth $c^1$ rotates. For this reason a recess $c^2$ having the shape of an arc of a circle, is provided in the disk $c$.

In the hereinbefore described examples the range-elevation drum and the site-elevation plates are mounted directly on the pivot pin L carried by the bracket B of the sighting apparatus. This pivot pin carries also the member (pinion $m$ or $Q^1$) that is connected kinematically with the journal $c$ of the said bracket. The result is that in order to read the site-elevations, the gunlayer is obliged to assume a different position from that which is required for reading the range-elevations and for actuating the various devices which he controls. The constructional example shown in Figs. 13 to 15 does away with these drawbacks.

In this example the pinion $m$ mounted on the pivot pin L and connected kinematically by means of the toothed sector $n$ to the journal $c$, forms one piece with a bevel wheel 1 that transmits the motion of the pinion $m$ to a bevel pinion 2 fixed on an axle 3 parallel to the hinge D and journaled in a part of the bracket B. On this axle 3 are mounted the range-elevation drum M and the site-elevation plate Q let into said drum. The positive connection between the drum M and the plate Q is effected for instance by means similar to the means shown in constructional form illustrated in Figs. 7 to 9, that is to say, by springs X.

It will be perceived that for indirect fire, it will be sufficient, as in the preceding examples, to incline the bracket B to the extent of the given site angle, the gunlayer reading the inclination off a site-elevation scale $q$ which he can see without having to change his position.

A pointer T engraved on the range-elevation drum M moves past the site-elevation scale $q$.

The range-elevation scale is drawn as a spiral on the outer face of the plate M as shown in Fig. 15. This scale is movable past a pointer O engraved on a slide block $O^1$. The latter is movable in a radial guide $B^2$ carried by the bracket B, and can thus be brought at will opposite any one of the turns of the spiral scale.

The bracket B has an extension $B^1$ provided at its free end with a head $b^1$ engaging in a cylindrical socket $g$. This socket $g$ serves as a nut G for a screw H operable by means of a knurled knob $i$, which latter is journaled in a slide block I guided in a guide $f$ carried by the gun carriage frame plate F.

The slide block I forms in its turn a nut for a screw R that is operable by means of a knurled knob $r$ and is journaled in the said guide $f$. By operating the knob $i$, the nut G is moved along the screw H for the purpose of bringing the bracket B into a vertical plane by rotation around the hinge D. By operating the knob $r$, the slide block I is moved along the screw R carrying with it the nut socket $g$—G and moving the extension $B^1$ and through it, the bracket B on the journal $c$.

Figure 16:
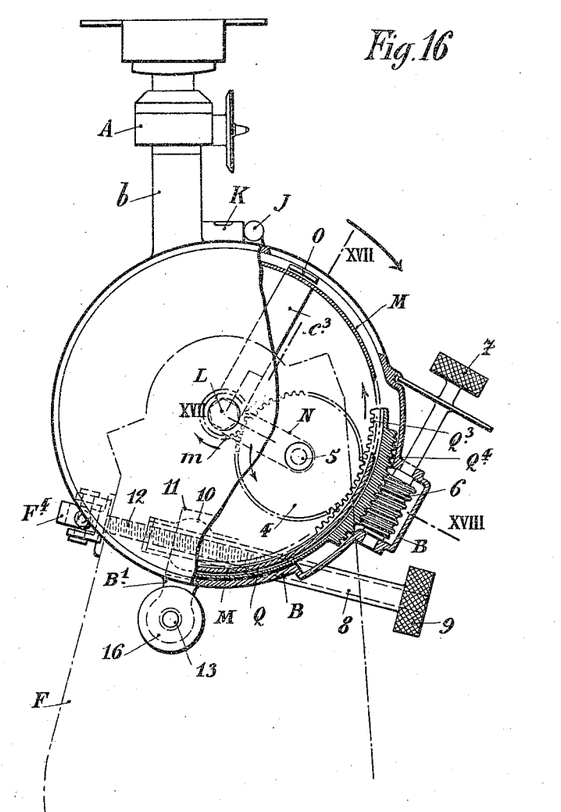
Fig. 16 is a front elevation partly in section on the line XVI—XVI of Fig. 17

Figs. 16 and 17 show a last constructional example.

In this example the pivot pin L, as in the constructional form shown in Figs. 10 to 12, is made to project from the journal $c$ along the geometrical axis of the latter. The range-elevation drum M mounted on this pivot pin, is fixed to the pinion $m$ that is connected kinematically to the journal $c$ of the bracket B. This connection is effected through the medium of a satellite wheel 4 mounted on an axle pin 5 parallel to the pivot pin L and carried by the arm N. The wheel 4 meshes with a ring of teeth $Q^3$ fixed to the site-elevation plate Q. On its outside the plate Q is provided with helical teeth $Q^4$ meshing with a worm 6 which is journaled in the bracket B and is operable by means of a knurled knob 7.

The journal $c$ carries at the end of an arm $c^3$, a pointer O movable past the range-elevation scale.

For a direct firing, the gunlayer directs the line of sight on to the target by suitably inclining for this purpose the bracket B by rotating the latter around the journal $c$. This operation is effected by means of the mechanism shown by way of example in the drawings. This mechanism comprises a sleeve-shaped nut 8 provided with a knurled knob 9 and movable by means of a ball and socket joint 10 in a correspondingly shaped bearing 11 carried by the bracket B. The nut 8 screws on a screw 12 connected by means of a Cardan joint to a bracket $F^4$ carried by the carriage frame plate F.

By rotating the nut 8 in the desired direction, the bracket B is inclined in such a manner as to bring the line of sight on the target. The rotation of the bracket B causes a corresponding angular displacement of the worm 6 and of the teeth $Q^4$ meshing with the latter. The result is that the site-elevation plate Q in turning through an angle equal to the site-elevation, carries with it by means of the satellite 4, the range-elevation drum M whose scale is shifted relatively to the pointer O. In order to incline the gun barrel through an angle equal to the firing angle, the gunlayer has merely to give the range-elevation by operating the gun-elevating mechanism in such a manner as to bring the selected range-elevation opposite the pointer O.

With the described satellite connection, the pointer O instead of being stationary as in the preceding examples, is movable with the journal $c$ so that it will receive a displacement in the reverse direction to that of the range-elevation drum. This displacement is necessitated by the fact that the range-elevation drum is not driven directly by the gun trunnion E, because the pinion $m$ receives its motion through the medium of the satellite wheel.

For indirect firing, the site-elevation plate Q is actuated by means of the screw 6—7, in such a manner as to bring the selected site-elevation opposite a pointer T engraved on the bracket B. As in the case of direct fire, the range-elevation drum M is caused to turn by the site-elevation plate Q through the medium of the satellite wheel 4.

The mechanism for returning the bracket B into a vertical plane in the case of an inclination of the trunnion E, comprises a screw 13 connected by a Cardan joint to a bracket 14 fixed to the carriage frame plate F. Upon this screw there works a nut 15 operable by means of a knob 16 and journaled in an extension B¹ of the bracket B.

It will be perceived that in all the constructional forms hereinbefore described there is a common essential characteristic, namely, the provision in the bracket B of the sighting apparatus, of a pivot pin L on which is mounted a member (pinion or disk $m$ or pinion Q¹) connected kinematically to the journal $c$ of the said bracket, and a connection between the said member and the range-elevation drum M or the site-elevation plate Q; the actuation of the gun cradle trunnion E serving to drive the said member, while the inclination of the bracket B by rotating around its journal $c$, causes the said member to roll over this journal. This arrangement unites in the hands of one and the same gunlayer, with the possible minimum number of parts, the site-elevation mechanism, the range-elevation mechanism and the devices for correcting the transverse and longitudinal inclinations of the gun carriage; it also allows, for a given site-elevation, of modifying the range-elevation without affecting the position of the line of sight.

What I claim is:—

1. In sighting apparatus for guns, a gun carriage, a gun having trunnions journaled in said carriage, a sight supporting bracket, a journal on which said bracket is adapted to rotate, said journal having a hinge connection with a trunnion of the gun, the hinge axis being parallel with the gun axis, means carried by a part of the gun carriage for swinging said bracket into a vertical plane, adjustable means normally holding said bracket in sighting position, a graduated member revolubly displaceable in respect to said bracket for indicating elevations and having driving connections with said hinged journal and other elevation indicating means operatively associated with said disk or drum.

2. In sighting apparatus for guns, a gun carriage, a gun having trunnions journaled in said carriage, a sight supporting bracket, a journal on which said bracket is adapted to rotate, said journal having a hinge connection with a trunnion of the gun, the hinge axis being parallel with the gun axis, means carried by a part of the gun carriage for swinging said bracket into a vertical plane, adjustable means for holding said bracket in sighting position, a device for indicating site elevations and a device for indicating range elevations operably connected therewith, and driving connections between one of said devices and said journal.

3. In a sighting apparatus for guns, a gun carriage, a gun having trunnions journaled in said carriage, a sight supporting bracket, a journal on which said bracket is adapted to rotate and said journal having a hinge connection with a trunnion of the gun, the hinge axis being parallel with the gun axis, means carried by a part of the gun carriage for swinging said bracket into a vertical plane, adjustable means normally holding said bracket in sighting position in said plane, a graduated member revolubly supported on said bracket for indicating elevations, and having driving connections with said hinged journal, and a second elevation indicating member having driving connections with said first-named member and means for adjusting said second member for elevations.

4. In a sighting apparatus for guns, a gun carriage, a gun having trunnions journaled in said carriage, a sight supporting bracket, a journal on which said bracket is adapted to rotate, said journal having a hinge connection with a trunnion of the gun, the hinge axis being parallel with the gun axis, means carried by a part of the gun carriage for swinging said bracket into a vertical plane, adjustable means normally holding said bracket in sighting position in said plane, a graduated member revolubly supported on said bracket for indicating elevations, a device for indicating site elevations and a device for indicating range elevations operatively connected to each other, one of which is mounted on said bracket, driving connections between one of said devices and said journal and means for adjusting the other sighting device.

5. In a sighting apparatus for guns, a gun carriage, a gun having trunnions journaled in said carriage, a sight supporting bracket, a journal on which said bracket is adapted to rotate, said journal having a hinge connection with a trunnion of the gun, the hinge axis being parallel with the gun axis, means carried by a part of the gun carriage for swinging said bracket into a vertical plane, adjustable means normally holding said bracket in sighting position in said plane, graduated members pivotally supported on said bracket and having frictional engagement with each other, driving connections between one of said members and said journal, and means for adjusting the other member in respect to its companion member.

6. In a sighting apparatus for guns, a gun carriage, a gun having trunnions journaled in said carriage, a sight supporting bracket, a journal on which said bracket is adapted to rotate, said journal having the hinge connection with the trunnion of the gun, the hinge axis being parallel with the gun axis, means carried by a part of the gun carriage for swinging said bracket into a vertical plane, adjustable means normally holding said bracket in sighting position in said plane, a drum pivotally mounted on said bracket and having peripheral graduations, driving connections between said drum and journal, a graduated disk frictionally engaging said drum, and means for adjusting the disk in respect to the drum.

7. In a sighting apparatus for guns, a gun carriage, a gun having trunnions journaled in said carriage, a sight supporting bracket, a journal on which said bracket is adapted to rotate, said journal having a hinge connection with a trunnion of the gun, the hinge axis being parallel with the gun axis, means carried by a part of the gun carriage for swinging said bracket into a vertical plane, adjustable means normally holding said bracket in sighting position in said plane, a drum pivotally mounted on said bracket and having peripheral graduations, rack and pinion connections between said drum and said journal, a graduated disk having frictional engagement with said drum, and means for adjusting the disk in respect to the drum.

In testimony whereof I have signed this specification.

EUGÈNE SCHNEIDER.

Witnesses:
ANDRÉ MOSTICKER,
CHAS. P. PRESSLY.